(12) United States Patent
Lee et al.

(10) Patent No.: US 12,111,651 B2
(45) Date of Patent: Oct. 8, 2024

(54) ROBOT SYNCHRONIZATION SEALER DISCHARGE SYSTEM

(71) Applicants: Hyundai Motor Company, Seoul (KR); Kia Corporation, Seoul (KR); DMTS Co., Ltd., Ulsan (KR)

(72) Inventors: Daewon Lee, Gyeonggi-do (KR); Tae Hoon Song, Gyeonggi-do (KR); Yoon Soo Kim, Gyeonggi-do (KR); Jae Sik Kang, Busan (KR); Joo Hyun Lim, Ulsan (KR); Yeong Min Kim, Ulsan (KR)

(73) Assignees: Hyundai Motor Company, Seoul (KR); Kia Corporation, Seoul (KR); DMTS Co., Ltd., Ulsan (KR)

( * ) Notice: Subject to any disclaimer, the term of this patent is extended or adjusted under 35 U.S.C. 154(b) by 434 days.

(21) Appl. No.: 17/493,387

(22) Filed: Oct. 4, 2021

(65) Prior Publication Data

US 2022/0291640 A1   Sep. 15, 2022

(30) Foreign Application Priority Data

Mar. 10, 2021   (KR) .................. 10-2021-0031123

(51) Int. Cl.
- G05B 6/02 (2006.01)
- B05C 5/02 (2006.01)
- B05C 11/00 (2006.01)
- B25J 15/00 (2006.01)
- G05D 7/06 (2006.01)

(52) U.S. Cl.
CPC .................. *G05B 6/02* (2013.01); *B05C 5/02* (2013.01); *B05C 11/00* (2013.01); *B25J 15/0019* (2013.01); *G05D 7/0676* (2013.01)

(58) Field of Classification Search
CPC ... G05B 6/02; B05C 5/02; B05C 11/00; B25J 15/0019; G05D 7/0676
See application file for complete search history.

(56) References Cited

U.S. PATENT DOCUMENTS

2018/0161801 A1*   6/2018   Jin .......................... B60R 13/06

* cited by examiner

*Primary Examiner* — Vishal I Patel
(74) *Attorney, Agent, or Firm* — Fox Rothschild LLP

(57) ABSTRACT

A robot synchronization sealer discharge system is provided. The robot synchronization sealer discharge system is interlocked with a robot for a sealer work of a vehicle factory and includes: a sealer gun mounted on a robot and moving along an application path of a vehicle body to discharge a sealer and a communication unit for receiving a TCP speed of the sealer gun moving based on robot operation. A synchronization controller assigns a unique ID and a received TCP time to the TCP speed and generates a discharge instruction message recording the sealer discharge amount according to the TCP speed. A sealer controller adjusts a discharge of the sealer gun based on the discharge instruction message and feeds back the sealer time according to a discharge completion to the synchronization controller.

13 Claims, 8 Drawing Sheets

(Conventional pattern discharge)

Agglomeration   Insufficient (Synchronization discharge of the present invention)

(Conventional pattern discharge)

(Synchronization discharge of the present invention)

ROBOT SYNCHRONIZATION SEALER DISCHARGE SYSTEM

CROSS-REFERENCE TO RELATED APPLICATION

This application claims priority to and the benefit of Korean Patent Application No. 10-2021-0031123 filed on Mar. 10, 2021, the entire contents of which are incorporated herein by reference.

BACKGROUND

(a) Field of the Disclosure

The present disclosure relates to a robot synchronization sealer discharge system, and more particularly, the present disclosure relates to a robot synchronization sealer discharge system for performing sealer control synchronized based on a robot's time.

(b) Description of the Related Art

In general, a vehicle factory performs a sealer process to apply a structure adhesive to prevent corrosion of a joint of a vehicle body and improve durability and strength. In the sealer process, a sealer may be applied manually, but an automated sealer system that performs the application work while moving a sealer gun using a robot is applied to improve application quality and work speed efficiency.

In the current vehicle factory, sealer equipment and robot equipment are managed by various independent makers to ensure installation and quality, and independent control methods are used according to their roles. Therefore, to apply to the sealer process, it is operated after teaching between the sealer equipment and the robot equipment.

For example, the robot system controls the movement of the sealer gun mounted on the tool, and the sealer system independently controls the work such as a discharge amount adjustment, a pattern adjustment, and sealer filling. At this time, for an interlocking of two systems, control information such as a movement timing each other, discharge timing, a discharge amount, and a pattern must be exchanged with each other.

In the case of a conventional method, about 32 bits are allocated to use 1 point for the discharge signal and 16 points for the discharge amount. When the worker moves the robot to move the sealer gun to a specific position of the product and inputs the discharge and the discharge amount, the sealer system receives the signal and drives the sealer discharge motor. Additionally, if the worker checks directly with the eyes and the application quality is low, teaching work is required to control the position of the sealer gun, the time of the application, the moving speed, and the accuracy.

However, if there is no understanding of the robot operation or when a worker with less skill is teaching, the discharge amount changes irregularly for each section where the sealer gun moves (e.g., a straight line/a curved line, etc.), so that there are problems that a constant amount of the application is not maintained, the sealer quality is deteriorated, and a lot of time to secure the quality is taken.

On the other hand, recently advanced robot makers have developed an integrated controller that secures the sealer quality during the teaching by controlling both the robot and the sealer, but it cannot be applied to various types of robots and sealer equipment operated in the existing factory. Therefore, there is a problem that additional costs are incurred for new introduction. Accordingly, there is an urgent need for a method capable of securing the sealer quality through the improved interlocking control of various types of robots and sealer equipment applied to the current vehicle factory.

The above information disclosed in this section is merely for enhancement of understanding of the background of the disclosure, and therefore it may contain information that does not form the prior art that is already known in this country to a person of ordinary skill in the art.

SUMMARY

An embodiment of the present disclosure provides a robot synchronization sealer discharge system for controlling a sealer gun with a synchronized discharge amount and time by setting an offset time that compensates for a sealer delay based on a moving speed and time of the sealer gun according to a robot execution when performing sealer work using a robot.

A robot synchronization sealer discharge system interlocked with a robot for a sealer work of a vehicle factory according to an embodiment of the present disclosure may include: a sealer gun mounted on a robot and moving along an application path of a vehicle body to discharge a sealer; a communication unit for receiving a TCP (Tool Center Point) speed of the sealer gun moving according to the operation of the robot; a synchronization controller for assigning a unique identification information (ID) and a received TCP time to the TCP speed and generating a discharge instruction message recording the sealer discharge amount according to the TCP speed; and a sealer controller for controlling a discharge of the sealer gun according to a sealer discharge amount of the discharge instruction message and feeding back the sealer time according to a discharge completion to the synchronization controller. The synchronization controller may be configured to derive an offset time as a deviation of the sealer time for the TCP time of the same ID from the feedback data through a pre-sealer work and advance the sealer gun operation time at the next sealer work by the offset time to control the discharge of the sealer gun at a synchronized time.

The sealer gun may be configured to discharge the sealer by driving a booster motor according to the sealer discharge amount of the discharge instruction message and transmit the discharge completion status for the discharge instruction message to the sealer controller. The sealer controller may include a servo driver to adjust the sealer discharge amount to the TCP speed by driving the booster motor of the sealer gun. When the sealer controller receives the discharge completion status through the servo driver, the sealer controller may be configured to feed back the instruction completion message generated by adding the sealer time to the discharge completion bit of the corresponding ID-based discharge instruction message to the synchronization controller.

The synchronization controller may be configured to sequentially generate a discharge instruction message including the ID, the TCP time, the TCP speed, and the sealer discharge amount for the TCP speed received in time-series in the entire section of the application path and transmit it to the sealer controller. The synchronization controller may be configured to extract the sealer discharge amount according to the TCP speed based on a predetermined sealer control map (MAP). The synchronization controller may be configured to accumulate and store the TCP speed of the sealer gun moved along the application path along the application path and the controlled sealer discharge amount data in time-series in response to the TCP time during the pre-sealer work.

The synchronization controller may be configured to extract the matched sealer discharge amount from the sealer discharge amount data based on the TCP speed and TCP time received at the next sealer work after the pre-sealer work. The synchronization controller may be configured to calculate an offset time by calculating the sealer delay time by a deviation that the TCP time is subtracted from the sealer time in the instruction completion message based on the same ID. In addition, the synchronization controller may be configured to calculate the offset time by further including the transmission delay time of the TCP speed received from the robot in the sealer delay time.

The synchronization controller may be configured to variable input at least one of the discharge pattern and the sealer width required for a discharge amount option of the discharge instruction message for each section of the application path through a worker input program (User Interface, UI). The synchronization controller may be configured to calculate the sealer discharge amount by using the TCP speed, a speed correction amount, a target amount, and a reduction value according to a time when adjusting the sealer width. In addition, the synchronization controller may be configured to detect and alarm an error event in which the deviation comparing the TCP time and the sealer time based on the same ID is out of a permissible error range through a correlation analysis of the data sampled after the next sealer work.

According to an embodiment of the present disclosure, the deviation of the operation time of the robot performing the independent control and the discharge time of the sealer gun are compensated through the offset control, thereby there are effects of reducing the inferiority rate of the sealer work and improving the coating quality. In addition, by generating the controlled time-series sealer discharge amount data according to the speed change of the sealer gun moving to the execution of the sealer work once in advance and using it for the next sealer work, it is possible to facilitate the teaching by non-experts and reduce the waste of a paint. Further, by correlating one instruction completion message sampled after each sealer work, it is possible to simply verify whether the robot operation time matches the sealer operation time, thereby reducing the inferiority rate.

DETAILED DESCRIPTION

Figure 1:
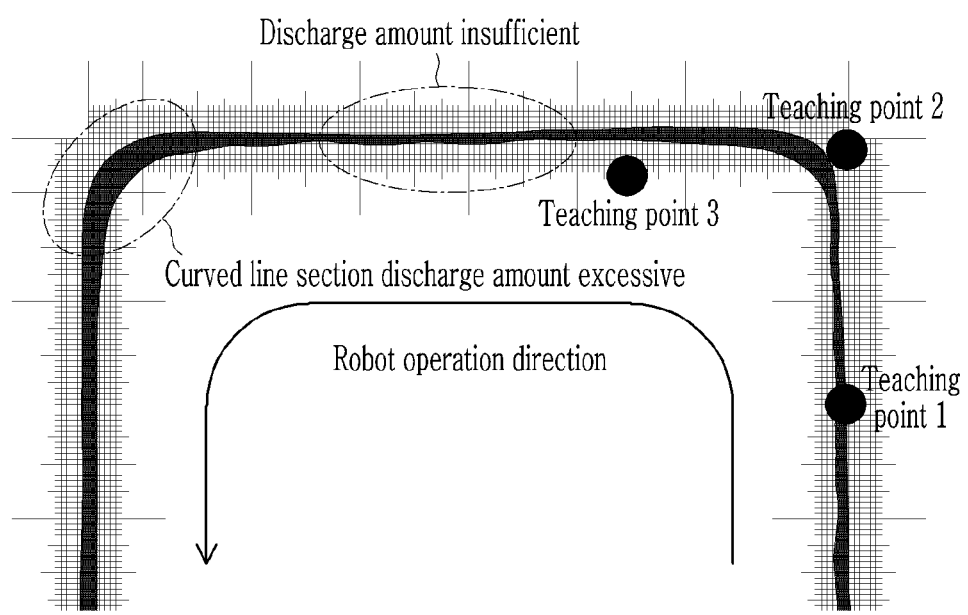
FIG. 1 is a view to explain a problem of a deteriorated application quality according to a speed change of a conventional robot gun.

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In addition, unless explicitly described to the contrary, the word "comprise", and variations such as "comprises" or "comprising", will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

Throughout the specification, terms such as "first", "second", "A", "B", "(a)", "(b)", etc. may be used to describe various elements, but the elements should not be limited by the terms. These terms are used only to differentiate the components from other components, but the nature, sequence, order, etc. of the corresponding components are not limited by these terms.

Also, in this specification, it is to be understood that when one component is referred to as being "connected" or "coupled" to another component, it may be connected or coupled directly to the other component or may be connected or coupled to the component with another component intervening therebetween. On the other hand, in this specification, it is to be understood that when one component is referred to as being "connected or coupled directly" to another component, it may be connected or coupled to the other component without another component intervening therebetween.

Terms used in the present specification are used only to describe specific embodiments, and are not intended to limit the present disclosure. Singular expressions used herein include plural expressions unless they have definitely opposite meanings in the context. In the specification, the word "comprise" or "has" is used to specify existence of a feature, a numbers, a process, an operation, a constituent element, a part, or a combination thereof, and it will be understood that existence or additional possibility of one or more other features or numbers, processes, operations, constituent elements, parts, or combinations thereof are not excluded.

Unless indicated otherwise, it is to be understood that all the terms used in the specification including technical and scientific terms have the same meaning as those that are understood by those who are skilled in the art. It must be understood that the terms defined by the dictionary are identical with the meanings within the context of the related art, and they should not be ideally or excessively formally defined unless the context clearly dictates otherwise.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Now, a robot synchronization sealer discharge system according to an embodiment of the present disclosure is described in detail with reference to accompanying drawings.

Prior to the description of the present disclosure in earnest, a problem of a conventional application quality deterioration should be explained in further detail with reference to FIG. 1. FIG. 1 is a view to explain a problem of a deteriorated application quality according to a speed change of a conventional robot gun.

Referring to FIG. 1, it shows the result of applying the speed at 700 mm/s after setting an application pattern of a sealer gun uniformly. In particular, in the straight line section, the sealer gun moves at a constant speed and the sealer width is constant, but the discharge amount occurs excessively as the speed of the curved line section changes, thereby it is difficult to secure application quality.

When a teaching worker applies the sealer in the curved line section, the teaching work inputs three teaching points (a teaching point 1, a teaching point 2, and a teaching point 3) to the robot controller. The robot controller calculates and executes each passing position and speed according to a predetermined accuracy in order to pass the three points as much as possible. At this time, if the basic condition such as a sealer gun weight mounted on the tool of the robot is constant, and the operation of the repeated cycle is the same as the initial teaching path and speed.

Meanwhile, the sealer pattern may be modified to increase the sealer quality. Theoretically, thousands of sealer patterns may be made, but since humans may not manage thousands, the sealer patterns of the limited quantities of around 10 are set and used. In the case of teaching the fine sections by using such a limited number of sealer patterns, humans must recognize and improve the amount of change, but it is virtually impossible. Therefore, although it relies on experienced and skilled experts as much as possible, there is a problem in that it is difficult to operate by an inexperienced worker (a teaching personnel) and application quality is deteriorated due to a human error.

In addition, when the overall discharge amount is increased to improve the application quality deteriorated problem, there is a problem that the vehicle body member cost increases. In addition, after determining the initial application quality, when the teaching is required again due to the distortion of the sealer gun due to a collision or the change in speed, it takes a lot of time, and accordingly there is a problem that the stop of the automated line is caused, thereby adversely affecting the yield.

As described above, in the case of the robots, basically after mounting the sealer gun, the operation for each work cycle is constant without a substantial difference within the error range after teaching once at the beginning. Accordingly, on the premise that the operation of the robot equipment is constant, the problem of the application quality in the sealer process increases the responsibility of the sealer equipment. Accordingly, the robot synchronization sealer discharge system according to an embodiment of the present disclosure aims to secure uniform application quality with one teaching by correcting the sealer operation time and discharge amount synchronized based on the operation time and speed of the robot.

For this purpose, the application quality was evaluated according to the repeated experiment of the robot with data obtained by measuring a number of the same sections, as a result, it was verified that the application quality of the repetitive work suggested by various types of low-cost robots (e.g., Kawasaki and Hyundai robots, etc.) is improved.

Figure 2:
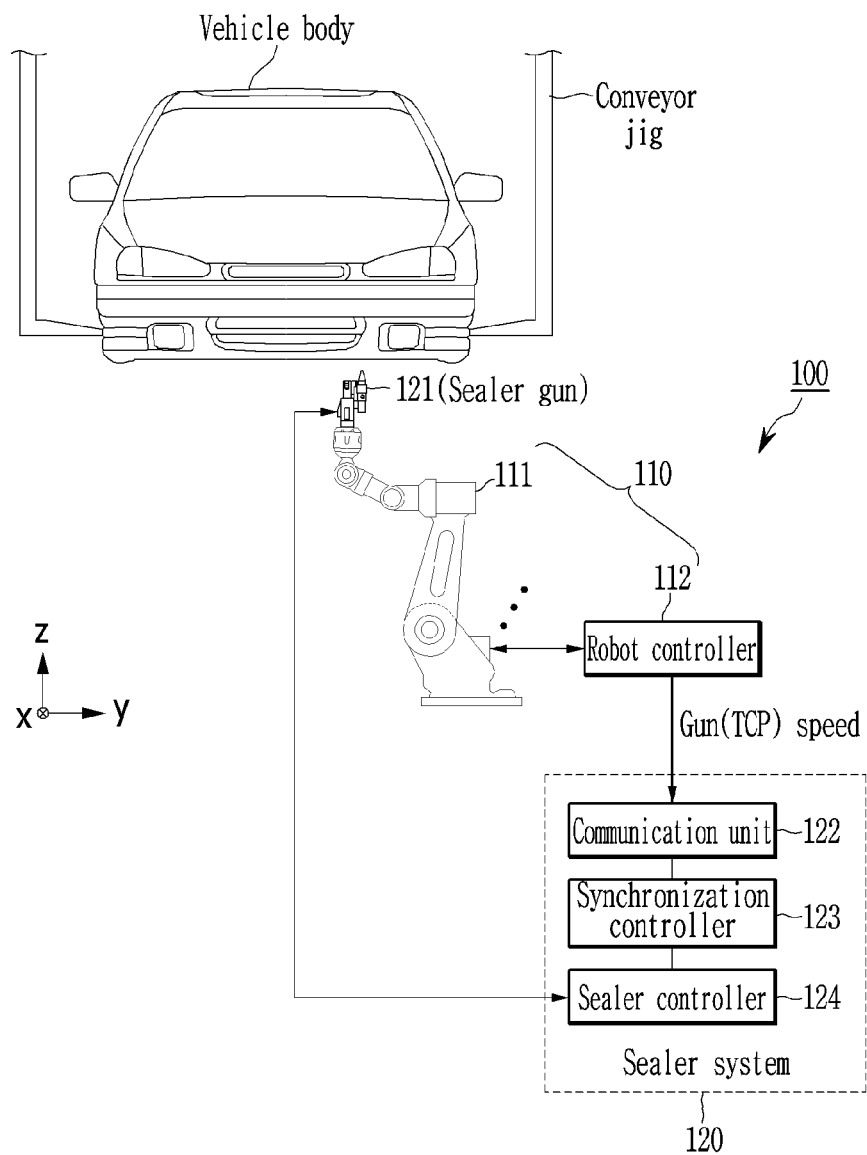
FIG. 2 is a view schematically showing a configuration of a robot synchronization sealer discharge system according to an embodiment of the present disclosure.

Hereinafter, a robot synchronization sealer discharge system according to an embodiment of the present disclosure is described. FIG. 2 is a view schematically showing a configuration of a robot synchronization sealer discharge system according to an embodiment of the present disclosure.

Referring to FIG. 2, a robot synchronization sealer discharge system 100 according to an embodiment of the present disclosure may include a robot system 110 and a sealer system 120. The robot system 110 may include a robot 111 of which a sealer gun 121 is mounted on an end effector of a six-axis articulated manipulator and a robot controller 112 configured to move the sealer gun 121 along an application path through attitude control of the robot 111. For example, one or more robots 111 may be disposed on the sealer process line and apply a sealer as a structural adhesive on the transported vehicle body. In particular, the vehicle body refers to a sealer work object in the sealer process line and may include a component constituting the vehicle body or a unit assembly product attached thereto.

The robot controller 112 may be configured to store the application path for the sealer work for each part of the vehicle body and adjust the movement of the sealer gun 121 mounted on the robot 111 based on this. The robot controller 112 may be configured to position the sealer gun 121 to a taught start point (SP) in a running mode or move it to a loading/unloading path to be returned from an end point (EP), actually to an application path where the sealer is applied through the sealer gun 121. The robot controller 112 may be interlocked with the sealer system 120 to operate the sealer gun 121 only in the work section from the start point (SP) to the end point (EP) defined as the application path in a robot coordinate system.

The robot controller 112 may be configured to detect relative TCP (Tool Center Point) coordinates of the sealer gun 121 based on coordinates (x, y, z) of the end effector according to the attitude information of the robot 111. In addition, when the robot 111 is operated, the robot controller 112 may be configured to measure the TCP (Tool Center Point) speed according to the movement of the sealer gun 121 in real time and transmits it for interworking with the sealer system 120. For example, it may be different for each maker, but in the case of Kawasaki robots, the speed may be measured, stored, and transmitted simply through software upgrades. In particular, the TCP speed refers to the moving speed of the sealer gun 121, which is substantially the same as the moving speed of the robot.

Meanwhile, the robot controller 112 may be configured to instruct the robot to move at a certain speed at a predetermined point during the teaching, but the actual passing speed of the predetermined point may be different from the instruction speed. This is because that the robot controller 112 side tries to control the movement as much as possible with the taught speed, but the robot 111 side generates variables such as the weight, the movement section, and the predetermined accuracy of the mounted sealer gun 121 so that there is a deviation between the instruction speed and the actual passing speed.

Accordingly, the robot controller 112 may be configured to perform sealer work (a test run) once after teaching the robot 111 and check the passing speed based on the actual measured time/speed. In addition, the robot controller 112 may be configured to detect an abnormal behavior of the robot based on the characteristic that the operation of the repeated period after the teaching is performed in the same manner as the one-time teaching operation. For example, in a case of a conventional welding robot, if the position of a welding gun was verified through a periodic half-destruction and welding point verification, the robot controller 112 of the present disclosure is a method for monitoring the speed of the sealer gun 121 during the sealer work of the robot 111 and then verifying it and it is possible to build a high quality system using low-cost robot models.

In addition, in the sealer system 120 to be described later, as above, a normalization process may be established to detect a decrease in the application quality due to the occurrence of an abnormality in speed and to take early action. On the other hand, the sealer system 120 may include a sealer gun 121, a communication unit 122, a synchronization controller 123, and a sealer controller 124.

The sealer gun 121 moves along the application path by the operation of the robot 111 and discharges the sealer to the vehicle body. The sealer gun 121 may include a sealer booster configured to adjust the discharge amount of the sealer by driving the servo motor according to the applied control signal. The communication unit 122 may include a wired/wireless interface configured to transmit and receive data with the robot controller 112 during the sealer work. The communication unit 122 may be configured to receive the moving speed (hereinafter, referred to as a TCP speed) of the sealer gun 121 according to the operation of the robot 111 from the robot controller 112.

The synchronization controller 123 may be configured to generate a sealer discharge amount according to the TCP speed received from the communication unit 122 and transmit it to the sealer controller 124. The sealer controller 124 may be configured to adjust the discharge amount of the sealer gun 121 according to the sealer discharge amount and feedback the sealer time based on the completion of the discharge to the synchronization controller 123. The synchronization controller 123 may be configured to derive an offset time according to the deviation of the TCP time at which the TCP speed was received and the sealer time corresponding thereto through pre-sealer work, and advance the sealer operation time at the next sealer work by the offset time, thereby adjusting the discharge of the sealer gun 121 at the synchronized time.

Figure 3:
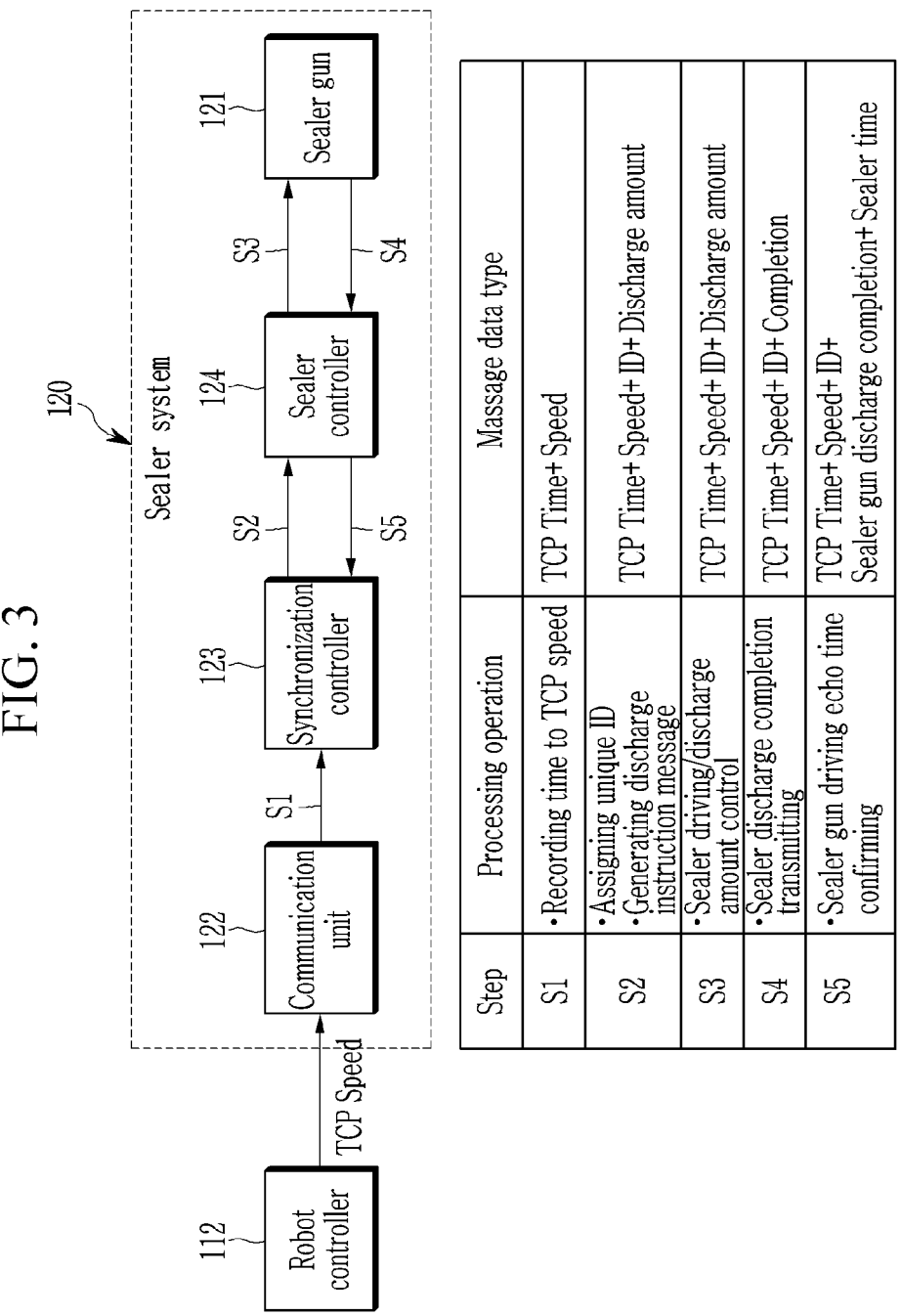
FIG. 3 is a view showing a processing operation flow for each configuration of a sealer system according to an embodiment of the present disclosure.

Meanwhile, the detailed configuration and role of the sealer system 120 according to an embodiment of the present disclosure is described in detail with reference to FIG. 3. FIG. 3 is a view showing a processing operation flow for each configuration of a sealer system according to an embodiment of the present disclosure. Referring to FIG. 3, a processing flow for each step that each configuration of the sealer system 120 is synchronized and controlled based on the robot time according to the sealer work of the robot controller 112 according to an embodiment of the present disclosure and a data format of sent and received messages are shown.

The communication unit 122 may be configured to receive the moving speed (hereinafter, referred to as the TCP speed) of the sealer gun 121 according to the operation of the robot 111 from the robot controller 112 during the sealer work and transmits it to the synchronization controller 123 (S1). At this time, the communication unit 122 may include and may be configured to transmit the TCP speed and the current-received current TCP time to the synchronization controller 123. In addition, the communication unit 122 may be configured to receive and transmit a sealer operation signal ON/OFF according to the position of the sealer gun 121 at the starting point (SP) and the end point (EP) of the application path from the robot controller 112.

When the synchronization controller 123 receives the TCP speed through the communication unit 122, it assigns unique identification information (ID) to the TCP speed to generate a discharge instruction message and transmit it to the sealer controller 124 for the sealer discharge control S2. At this time, the synchronization controller 123 may be configured to record and transmit the sealer discharge amount according to the TCP speed in the discharge instruction message. The synchronization controller 123 may be configured to sequentially generate a discharge instruction message including the ID, the TCP time, the TCP speed, and the sealer discharge amount for the TCP speed received in time-series according to the operation of the robot 111 in the entire section of the application path during the sealer work, and transmit it to the sealer controller 124.

Hereinafter, a method of generating the sealer discharge amount of the synchronization controller 123 is described in further detail. The synchronization controller 123 may be configured to extract the sealer discharge amount according to the TCP speed based on a sealer control map (MAP) predetermined in advance. The sealer discharge amount is changed according to the speed of the sealer gun 121 attached to the robot 111, and to apply a predetermined constant amount, the discharge amount and the TCP speed must be in a proportional relationship.

For example, when the minimum speed of the robot 111 is set to 200 mm/s and the maximum speed is set to 700 mm/s, the sealer discharge amount may be calculated using Equation 1 below.

Discharge amount=speed×1/(maximum speed−minimum speed)     Equation 1

The synchronization controller 123 prepares a control map (MAP) that may adjust the sealer discharge amount corresponding to the TCP speed by learning through an experiment in advance to apply a constant amount of the sealer according to the TCP speed.

The synchronization controller 123 may be configured to accumulate and store in time-series the sealer discharge amount data controlled corresponding to the TCP speed and the TCP time of the sealer gun 121 moved along the application path during the sealer work once (i.e., one cycle) in advance. Additionally, in the next sealer work, the matched sealer discharge amount may be extracted from the sealer discharge amount data based on the TCP speed and TCP time of the robot 111. Therefore, there is an advantage of reducing a burden of calculating the real time sealer discharge amount according to the TCP speed change during the sealer work.

Meanwhile, the sealer controller 124 may be configured to operate the booster motor based on the sealer discharge amount of the discharge instruction message to adjust the discharge amount of the sealer gun 121 S3. This sealer controller 124 may include a servo driver to adjust the sealer discharge amount according to the TCP speed by driving the booster motor of the sealer gun 121. The sealer gun 121 may be configured to discharge the sealer by driving the booster motor according to the sealer discharge amount of the discharge instruction message, and transmit the discharge completion status for the corresponding discharge instruction message to the sealer controller 124 (S4).

When the sealer controller 124 receives the discharge completion status through the servo driver, it feeds back the instruction completion message generated by adding the sealer time to a discharge completion bit of the discharge instruction message based on the corresponding ID to the synchronization controller 123 (S5). In particular, the sealer time has a sealer delay time with respect to the TCP time based on the same ID. When the synchronization controller 123 receives the instruction completion message from the sealer controller 124, the synchronization controller 123 may be configured to analyze the instruction completion message and calculate the sealer delay time for how long the sealer operation is delayed for the TCP speed based on the same ID.

At this time, the synchronization controller 123 may be configured to calculate the sealer delay time by subtracting the TCP time from the sealer time in the instruction completion message based on the ID. Therefore, the synchronization controller 123 may be configured to set the offset time to correct the sealer delay time after executing the sealer work once in advance, and adjust the sealer operation time for the entire sealer work section to be advanced by the offset time from the next sealer work. In other words, the synchronization controller 123 may be configured to start the operation of the robot 111 during the sealer work and adjust the sealer discharge at the synchronized time to be advanced by the offset time earlier than the time when the sealer gun 121 passes the predetermined starting point (SP) in the application path.

Meanwhile, an example of deriving the delay time of the robot and sealer according to the time/speed measured at the actual robot and the sealer side after one sealer work in advance, and the offset time according thereto, is described with reference to FIG. 4 to FIG. 6. First, FIG. 4 shows the delay time generated between the robot controller and the sealer controller during the sealer work according to an embodiment of the present disclosure.

Figure 4:
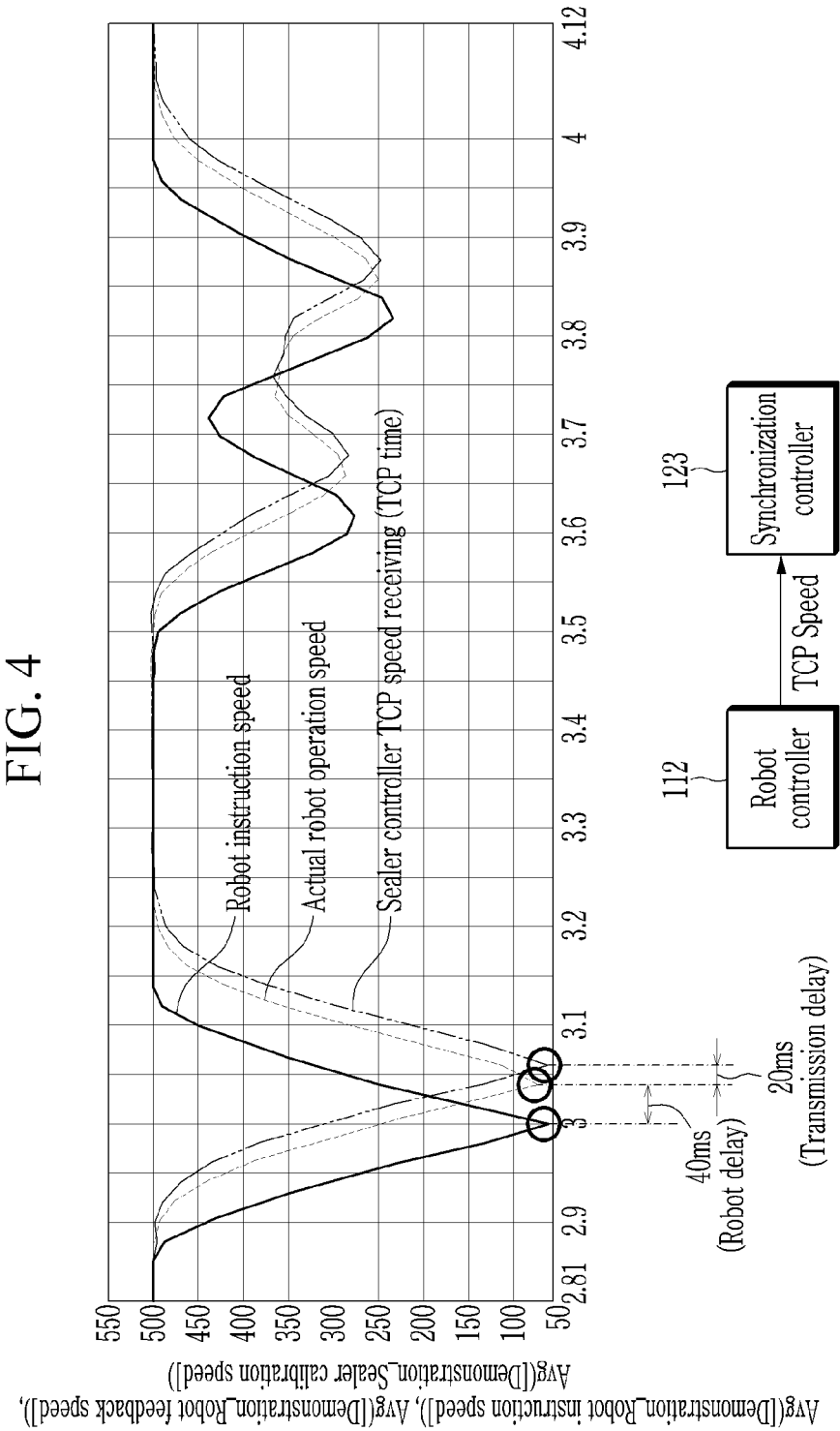
FIG. 4 is a view showing a delay time generated between a robot controller and a sealer controller during sealer work according to an embodiment of the present disclosure.

Referring to FIG. 4, the occurrence times of the robot instruction speed of the robot controller 112 when the sealer work is executed once in advance, the robot operation speed fed back from the actual robot, and the TCP speed received from the robot controller 112 to the sealer controller 124 are measured according to a time and graphed.

Particularly, if described based on a circled portion of each graph, the robot controller 112 may be configured to instruct the movement of the robot 111 in reference seconds (3.000 seconds). The robot 111 tries to move as much as possible according to the instruction in the reference second, but a certain robot delay occurs due to mount variables of the sealer gun 121, and the robot 111 is actually operated 40 ms (3.040 seconds) later. In addition, the synchronization controller 123 of the sealer system 120 may be configured to receive and store the TCP speed according to the actual robot operation transmitted from the robot controller 112, but it may be confirmed that a transmission delay of 20 ms is constantly generated during this process.

Each delay time may vary depending on the environment, but as a result of analyzing the data through a plurality of experiments, the robot delay and the transmission delay for the robot instruction in the same environment appear constant. Therefore, in the robot system 110 and the sealer system 120 installed in the same environment in the sealer process line, the data measured by executing the sealer work once in advance appear the same in the repeated sealer work afterwards.

Further, a noteworthy fact is that the synchronization controller 123 according to an embodiment of the present disclosure adjusts the sealer discharge based on the reception time (the TCP time) of the TCP speed according to the actual robot operation, not the time when the first robot operation is instructed from the robot controller 112. In other words, an embodiment of the present disclosure does not use the robot instruction speed and is synchronized based on the actual robot operation speed (i.e., the TCP time), so it has a feature that may be avoided without being affected by the robot delay.

Figure 5:
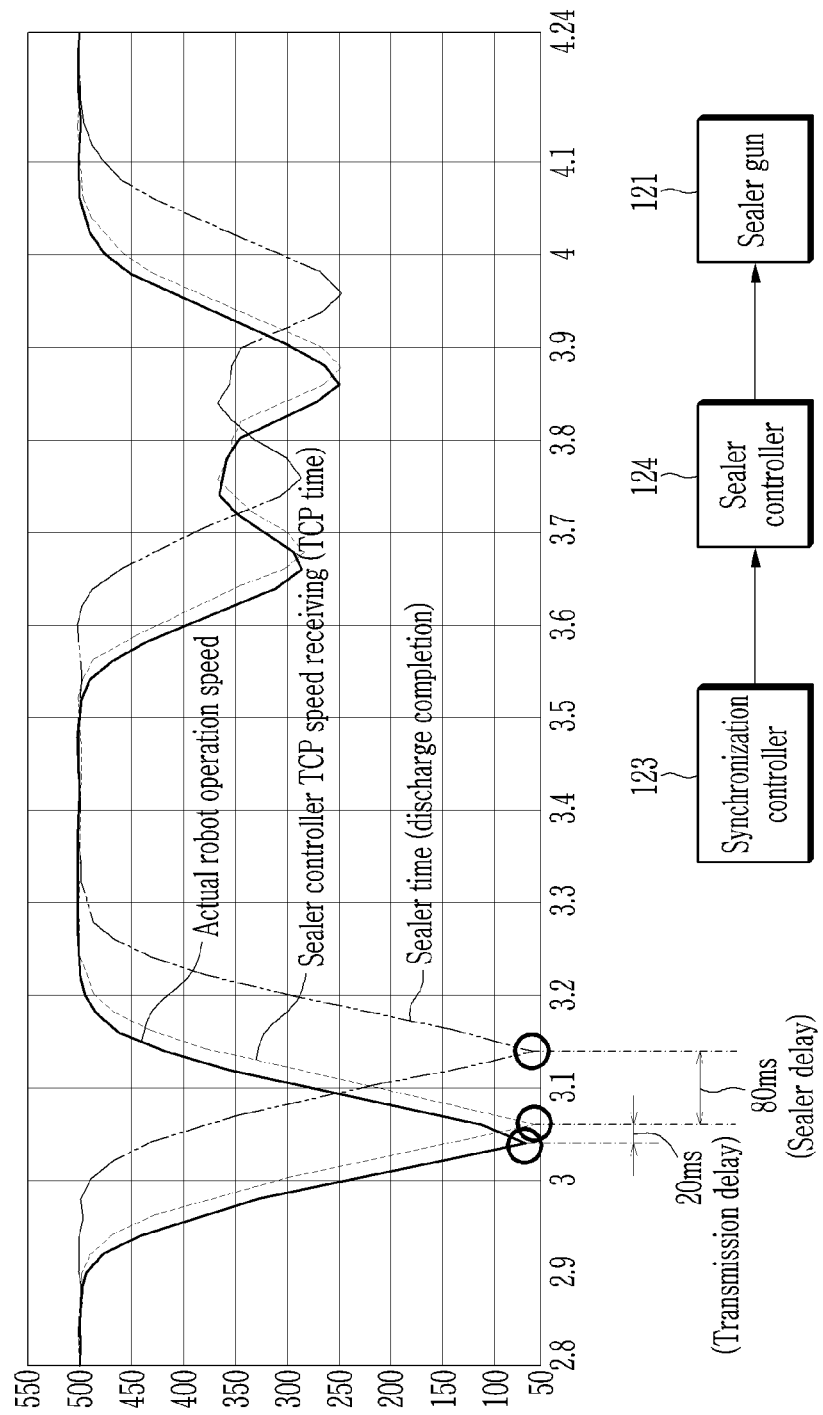
FIG. 5 is a view showing a delay time generated in a sealer system during sealer work according to an embodiment of the present disclosure.

Next, FIG. 5 shows the delay time generated in the sealer system during the sealer work according to an embodiment of the present disclosure. Referring to FIG. 5, as described above, it may be confirmed that the TCP time at the time when the TCP speed is received from the robot controller 112 appears constant with a transmission delay of 20 ms for the entire section in the synchronization controller 123 of the sealer system 120.

In addition, it may be confirmed that the 80 ms sealer delay time consistently appears in the entire section between the feedback sealer times by completing the discharge based on the TCP time at which the synchronization controller 123 received the TCP speed. Therefore, the sealer delay time may be calculated by the deviation of which the TCP time is subtracted from the sealer time based on any one ID sampled from the instruction completion message collected during the sealer work in the synchronization controller 123.

Figure 6:
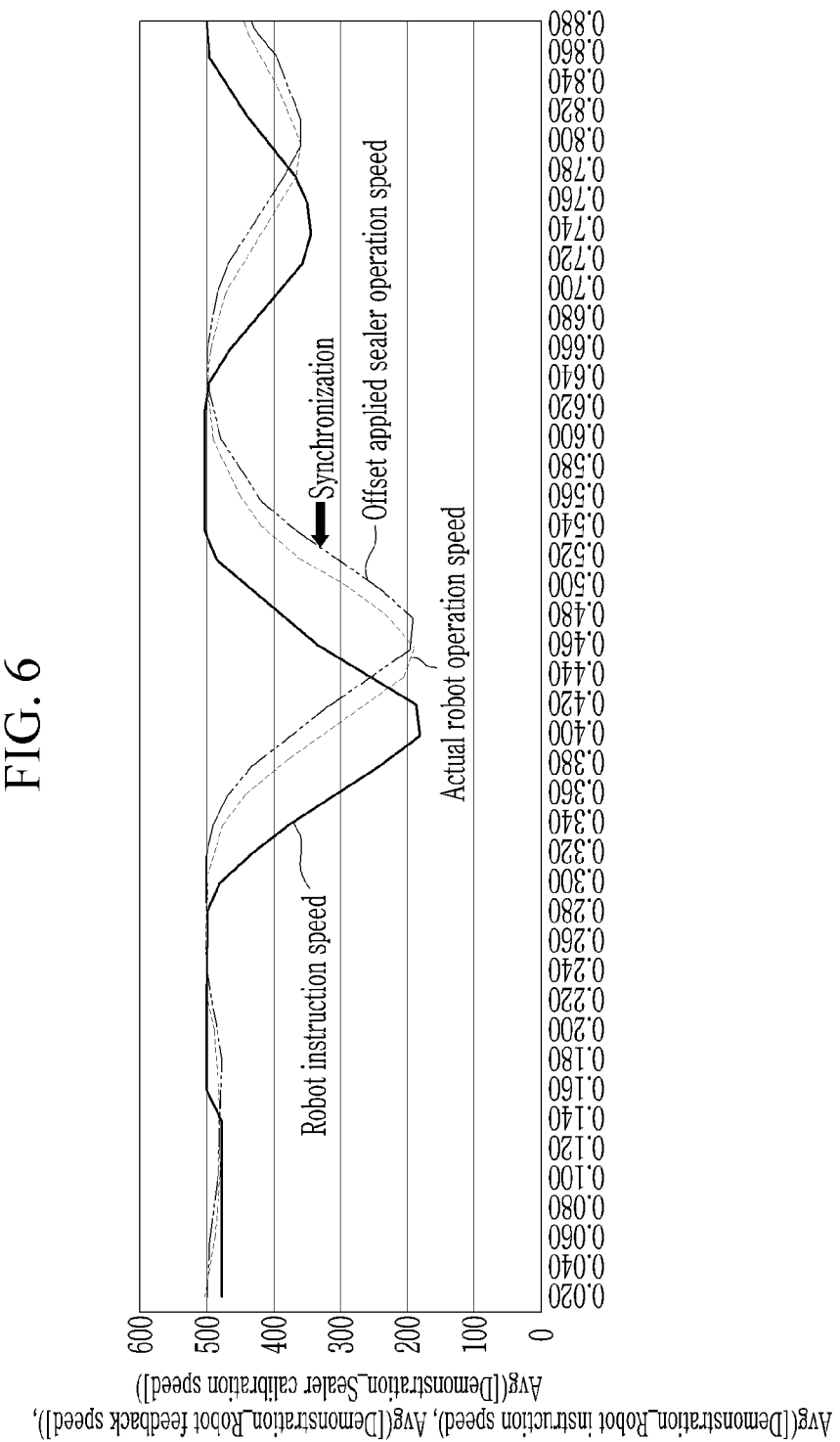
FIG. 6 is a view showing a graph in which an offset is applied to a sealer operation time point for an entire section of an application path according to an embodiment of the present disclosure.

The synchronization controller 123 may be configured to set the offset time to correct the sealer delay time and adjust the sealer operation time for the entire application path section to be advanced by the offset time from the next sealer work, For example, FIG. 6 shows a graph in which an offset is applied to the sealer operation point for the entire application path section according to an embodiment of the present disclosure.

Referring to FIG. 6, the synchronization controller 123 may be configured to compensate the sealer delay time of 80 ms by advancing the sealer operation time by the offset time. Through this, the discharge operation of the sealer gun 121 may be adjusted according to the correct time based on the TCP time from the next sealer work. On the other hand, the transmission delay time of 20 ms between the actual robot operation speed and the sealer offset control speed may still exist, but it is not a substantial problem since it is within the experimentally permissible error range. Therefore, to simply manufacture the equipment of the sealer system 120 based on the robot system 110, the system may be implemented to compensate only the sealer delay time of 80 ms that may be checked in the synchronization controller 123.

However, an embodiment of the present disclosure is not limited thereto, and the synchronization controller 123 may be configured to advance the transmission delay time of 20 ms by 100 ms in addition to the offset time considering the sealer delay time of 80 ms. For example, the synchronization controller 123 may be configured to simultaneously receive the TCP speed and the TCP time measured by the robot controller 112 and calculate the sealer delay time of 100 ms including the transmission delay time of 20 ms by using the TCP time measured by the robot side. In addition, it may be calculated to additionally reflect the transmission delay time of 20 ms, which appears constant on the synchronization controller 123, to the offset time.

Through this, by additionally compensating the transmission delay time of 20 ms, the actual robot operation speed in the entire section and the sealer offset control speed are matched, thereby enabling more accurate synchronization control. On the other hand, the synchronization controller 123 may be configured to analyze the instruction completion message fed back from the sealer controller 124 during the sealer work to detect whether there is a discrepancy between the TCP speed and TCP time of the robot 111 and the discharge and sealer time of the sealer gun 121 through correlation analysis. At this time, the synchronization controller 123 may be configured to detect an error event in which the deviation comparing the sealer time based on the TCP time recorded in the instruction completion message of the same ID sampled after the sealer work is out of the permissible error range. Additionally, an alarm may be output to the worker to provide a notification related thereto. Therefore, before the next sealer work, the worker may take measures for the sealing work error.

Figure 7:
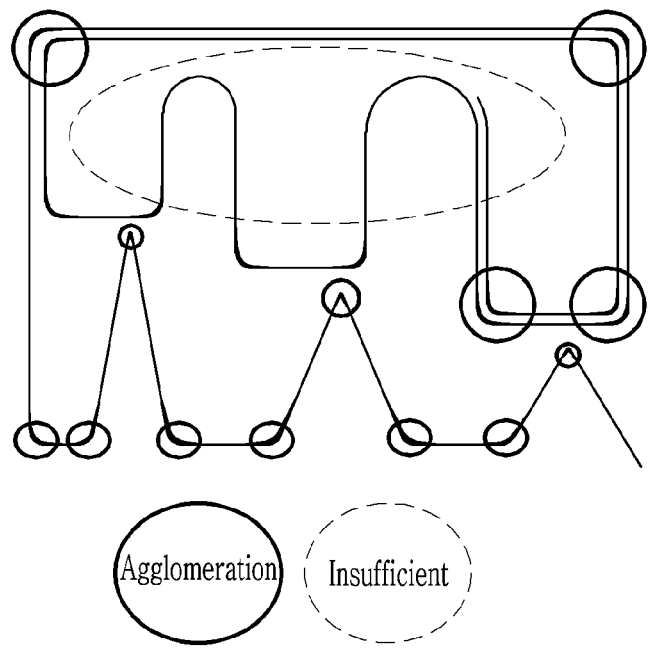
FIG. 7 is a view showing a comparison of application results of a conventional pattern discharge method and a synchronization discharge method according to an embodiment of the present disclosure.
Figure 7:
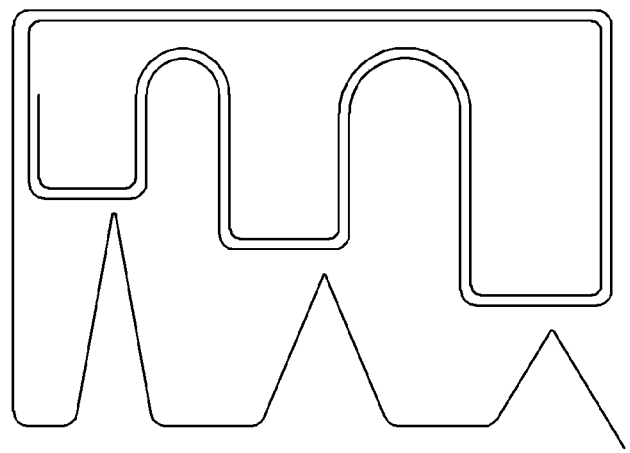

Meanwhile, FIG. 7 shows a comparison of the application results of a conventional pattern discharge method and a synchronization discharge method according to an embodiment of the present disclosure. Referring to FIG. 7, in the conventional pattern discharge method, when the sealer is applied, the worker must directly adjust the discharge. However, even if the worker manually inputs a specific pattern for each section and controls the on/off signal (ON/OFF), it is impossible to finely adjust them, so there is a drawback that causes an agglomeration or insufficient section of the sealer. Even if a certain degree of the fine adjustment is possible through an experienced expert, a constant quality may not be guaranteed due to a human error. In addition, due to the limitation of the cycle time of the automated process, it is substantially impossible to be used in the field.

On the other hand, the synchronization discharge method according to an embodiment of the present disclosure may ensure the constant coating quality and reduce the sealer discharge amount by 80% in the acceleration/deceleration section. It was confirmed that about an 80% reduction effect was achieved when the container was mounted on the actual sealer gun 121 and the entire sealer discharge amount was compared after the conventional pattern discharge method and the synchronization discharge method were executed.

In addition, conventionally, it takes a lot of time to secure the quality if only modifying by the teaching when applying the sealer to an initial product. Moreover, if the worker is not a sealer teaching expert such as a field operator, more time is required to secure the quality. Therefore, if the initial application is performed using the robot synchronization sealer discharge system 100 of the present disclosure, even a non-specialist may apply the sealer with the constant quality. This helps shorten a development of new vehicles and has an effect of reducing the number of interruptions in case of line problems.

As described above, according to an embodiment of the present disclosure, the deviation of the operation time of the robot performing the independent control and the discharge time of the sealer gun are compensated through the offset control, thereby there are effects of reducing the inferiority rate of the sealer work and improving the coating quality. In addition, by generating the controlled time-series sealer discharge amount data according to the speed change of the sealer gun moving to the execution of the sealer work once in advance and using it for the next sealer work, it is possible to facilitate the teaching by non-experts and reduce the waste of a paint.

In addition, by correlating one instruction completion message sampled after each sealer work, it is possible to more simply verify whether the robot operation time matches the sealer operation time, thereby reducing the inferiority rate. Further, it is possible to expect the effect of a production cost reduction by supporting various types of the robots and the sealers already installed and operated in the factory to perform the synchronized operation with only software configuration without configuring additional hardware for the integrated control of the robot and the sealer.

In the above, an embodiment of the present disclosure has been described, but the present disclosure is not limited to the above embodiment, and various other modifications are possible. For example, in the above-described embodiment of the present disclosure, it has been described as controlling the sealer discharge amount according to the TCP speed after setting the coating pattern constant, but is not limited thereto, and the discharge pattern and sealer width for each section of the application path may be controlled to be adjusted.

Accordingly, the synchronization controller 123 may further include a program (User Interface, UI) that the worker may input to adjust the discharge amount for each specific section on the application path, if necessary. The UI may variably input at least one of the discharge pattern and the sealer width required for a discharge amount option of the ID-based discharge instruction message matched in time series according to the section of the application path. In other words, this means that the worker may modify or add the predetermined control value of the discharge instruction message for each section through the UI.

Accordingly, the sealer controller 124 may be configured to adjust the discharge pattern for each acceleration/deceleration section during the movement of the sealer gun 121 according to the discharge instruction message or adjust the sealer width at the constant TCP speed. For example, FIG. 8 shows a comparison of states of a sealer width adjustment of a conventional pattern discharge method and a synchronization discharge method according to an embodiment of the present disclosure.

Figure 8:
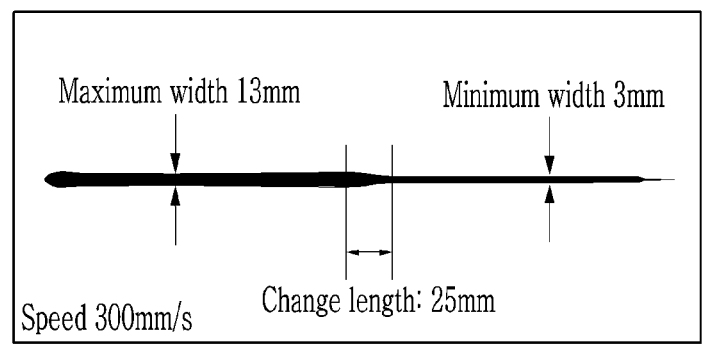
FIG. 8 is a view showing a comparison of a state of a sealer width adjustment of a conventional pattern discharge method and a synchronization discharge method according to an embodiment of the present disclosure.
Figure 8:
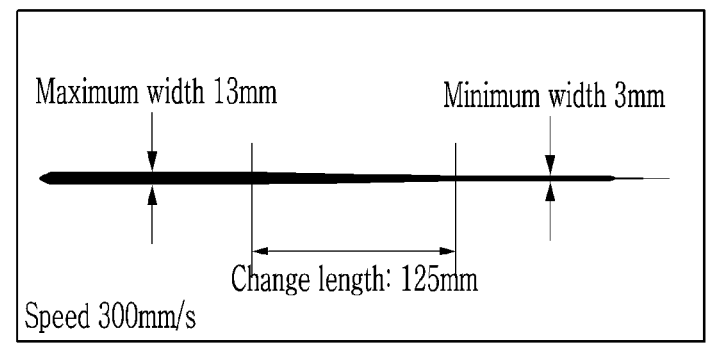

Referring to FIG. 8, when the sealer gun 121 is changed from the maximum width to the minimum width while moving at the constant speed, if the on/off (ON/OFF) signal is controlled by the conventional pattern discharge method, the discharge amount is rapidly adjusted. Due to this, there is a drawback that the width of the sealer cannot be finely adjusted in the changing length section of 25 mm. On the other hand, the sealer controller 124 according to an embodiment of the present disclosure may be configured to gently adjust the amount of the change in the sealer width through the control of the discharge amount through the setting of the sealer width even under the constant TCP speed.

In particular, the discharge amount may be calculated through Equation 2 below using a speed, a speed correction amount, a target amount, and a reduction value according to a time, and the distance according to the time may be calculated after the test.

Discharge amount=speed×speed correction amount× target amount×reduction value according to the time   Equation 2

Through this, there is an advantage that it is possible to finely adjust the width of the sealer in the changing length of 125 mm. In this test, the maximum width of 13 mm and the minimum width of 3 mm may be determined according to a sealer viscosity, and if a sealer with low viscosity is applied to a slot type of nozzle, the difference may be adjusted to be greater. The sealer work corresponding to various patterns may be performed through a sealer width adjustment algorithm according to this embodiment of the present disclosure.

The above-described embodiments of the present disclosure can be applied to programs that allow computers to execute functions corresponding to the configurations of the embodiments of the disclosure or recording media including the programs as well as the method and apparatus. Those skilled in the art can easily implement the applications from the above-described embodiments of the present disclosure.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

100: robot synchronization sealer discharge system
110: robot system
111: robot
112: robot controller
120: sealer system
121: sealer gun
122: communication unit
123: synchronization controller
124: sealer controller

What is claimed is:

1. A robot synchronization sealer discharge system interlocked with a robot for sealer work of a vehicle factory, comprising: a sealer gun mounted on a robot and moving along an application path of a vehicle body to discharge a sealer; a communication unit configured to receive a Tool Center Point (TCP) speed of the sealer gun moving according to an operation of the robot; a synchronization controller configured to assign unique identification information (ID) and a received TCP time to the TCP speed and generate a discharge instruction message recording a sealer discharge amount according to the TCP speed; and a sealer controller configured to adjust a discharge of the sealer gun according to the sealer discharge amount of the discharge instruction message and feedback a sealer time according to discharge completion to the synchronization controller, wherein the synchronization controller is configured to derive an offset time as a deviation of the sealer time for the TCP time of a same ID from the feedback data through pre-sealer work and advance a sealer gun operation time at a next sealer work by the offset time to adjust the discharge of the sealer gun at a synchronized time.

2. The robot synchronization sealer discharge system of claim 1, wherein the sealer gun is configured to discharge the sealer by driving a booster motor according to the sealer discharge amount of the discharge instruction message and transmit the discharge completion status for the discharge instruction message to the sealer controller.

3. The robot synchronization sealer discharge system of claim 2, wherein the sealer controller includes a servo driver to adjust the sealer discharge amount to the TCP speed by driving the booster motor of the sealer gun.

4. The robot synchronization sealer discharge of claim 3, wherein when the sealer controller receives the discharge completion status through the servo driver, the sealer controller is configured to feed back the instruction completion message generated by adding the sealer time to the discharge completion bit of a corresponding ID-based discharge instruction message to the synchronization controller.

5. The robot synchronization sealer discharge of claim 1, wherein the synchronization controller is configured to sequentially generate the discharge instruction message including the ID, the TCP time, the TCP speed, and the sealer discharge amount for the TCP speed received in time-series in an entire section of the application path and transmit it to the sealer controller.

6. The robot synchronization sealer discharge system of claim 1, wherein the synchronization controller is configured to extract the sealer discharge amount according to the TCP speed based on a predetermined sealer control map (MAP).

7. The robot synchronization sealer discharge system of claim 6, wherein the synchronization controller is configured to accumulate and store the TCP speed of the sealer gun moved along the application path along the application path and the controlled sealer discharge amount data in time-series in response to the TCP time during the pre-sealer work.

8. The robot synchronization sealer discharge system of claim 7, wherein the synchronization controller is configured to extract the matched sealer discharge amount from the sealer discharge amount data based on the TCP speed and TCP time received at the next sealer work after the pre-sealer work.

9. The robot synchronization sealer discharge system of claim 1, wherein the synchronization controller is configured to calculate the offset time by calculating a sealer delay time by a deviation that the TCP time is subtracted from the sealer time in an instruction completion message based on the same ID.

10. The robot synchronization sealer discharge system of claim 9, wherein the synchronization controller is configured to calculate the offset time by further including the transmission delay time of the TCP speed received from the robot in the sealer delay time.

11. The robot synchronization sealer discharge system of claim 1, wherein the synchronization controller is configured to variable input at least one of a discharge pattern and a sealer width required for a discharge amount option of the discharge instruction message for each section of the application path through a worker input program.

12. The robot synchronization sealer discharge system of claim 11, wherein the synchronization controller is configured to calculate the sealer discharge amount by using the TCP speed, a speed correction amount, a target amount, and a reduction value according to a time when adjusting the sealer width.

13. The robot synchronization sealer discharge system of claim 1, wherein the synchronization controller is configured to detect and output an alarm regarding an error event in which the deviation comparing the TCP time and the sealer time based on the same ID is out of a permissible error range through a correlation analysis of data sampled after the next sealer work.

* * * * *